United States Patent Office 2,907,681
Patented Oct. 6, 1959

2,907,681
COMPOSITION FOR DEPOSITION OF A PARTING SURFACE FILM

Alver Dunbar, Philadelphia, Pa., George J. Hausmann, Merchantville, N.J., and Bayard S. Johnson, Ardmore, Pa., assignors to Franklin Research Company, Philadelphia, Pa., a corporation of Pennsylvania No Drawing. Application June 10, 1957
Serial No. 664,490

11 Claims. (Cl. 117—92)

This invention relates to compositions for depositing a parting surface film on materials which otherwise would adhere to other surfaces and particularly to compositions which, on drying, deposit a parting surface film capable of preventing or substantially reducing the tendency of bituminous material surfaces and the like to adhere or stick to other surfaces.

It has long been recognized that bituminous or asphaltic type materials or bituminous or asphalt coated materials have a decided tendency to stick to other surfaces even at ordinary temperatures and particularly under storage conditions where pressure is applied to such materials. The same is true of uncured rubber, either natural or synthetic rubber-like polymers. This sticking problem is especially serious in materials which are coated with relatively low melting point asphalt, as is the case in certain types of shingles termed "self-sealing" shingles, such as described in U.S. Patent 2,210,209. Various attempts have been made to overcome this sticking difficulty, including the application of finely divided or powdered materials such as salt, mica, talc, air slaked lime and the like. However, the use of such dusting materials for this purpose involves a number of disadvantages, including lack of adhesion and a marked tendency to transfer to adjacent or contacting surfaces. Liquid compositions, such as polyvinyl alcohol solution, have also been proposed, but these coatings do not form a lasting anti-stick protection because they are removed if the surface is washed or exposed to the elements. Consequently, the art has long sought for an effective parting medium for bituminous or asphalt and uncured rubber surfaces, but so far as we are aware no completely satisfactory anti-stick composition, either solid or liquid, has been developed for bituminous or uncured rubber surfaces.

The principal object of the present invention is to provide a liquid composition which will, on drying, deposit an adherent, water resistant, parting surface film which will penetrate into the pores of the filmed surface and which will materially lessen the adhesive bond which otherwise would be set up between a surface of asphaltic or uncured rubber and a surface in contact therewith. The composition of the present invention may be applied to the non-asphaltic surface or to the asphaltic surface, or to both.

A further object of the present invention is to provide a liquid composition which may be spread in a thin film on an asphaltic or uncured rubber surface or on a surface which will come into contact with an asphaltic or uncured rubber surface and which on drying will deposit an adherent, water resistant metallic oxide or hydroxide film which will serve to materially reduce the tendency of the materials so treated from sticking.

A further object of the present invention is to provide a liquid composition which, when applied in a relatively thin film to an asphaltic or uncured rubber surface or a surface which will come into contact therewith, will deposit on drying an adherent, water resistant film which resists adhesion to bituminous and uncured rubber surfaces coming in contact therewith even though the second surface be untreated.

We have discovered that bituminous or asphaltic materials or materials coated with bituminous material such as asphalt, and likewise uncured rubber materials, are rendered substantially less susceptible to sticking to other materials by providing, either on the other material or on the asphalt outer surface, a thin adherent and water resistant film consisting of a metallic hydroxide or metallic oxide, as hereinafter described. The composition of the present invention is characterized by the fact that when spread in the form of a relatively thin film, it will, on being subjected to a drying action, deposit in the pores and on the surface of the material to be protected or in and on the asphalt surface a protective, adherent and water resistant metallic hydroxide or metallic oxide film which has the surprising characteristic of rendering the coated surface substantially less susceptible to a sticking action.

The composition of the present invention may vary somewhat as to its individual components but consists broadly of a liquid composition containing a water soluble waxy material or an emulsified water insoluble waxy material and a component which on drying will form a water resistant film. The liquid composition contains a metallic salt of an acid selected from the group consisting of hydrochloric acid, hydrobromic acid, formic acid and acetic acid, with the metal being taken from the group consisting of aluminum, zinc and zirconium. The waxy film and metallic salt thus deposited form in the pores and on the surface of the coated material as either the hydroxide or the oxide of the metal salt. We have discovered that such an oxide or hydroxide waxy film has the peculiar and unexpected property of resisting the normal adhesion which occurs when an asphaltic or uncured rubber surface comes into contact with another surface. We have further found that the anti-sticking effect is obtained with such waxy films on application of the film either to the asphaltic or uncured rubber surface or the other surface or to both surfaces. In this connection it should be noted that the anti-sticking effect is dependent upon forming such a film. The present invention is not intended to include compositions which are applied initially in the solid form.

The following examples are set forth merely by way of illustration of the present invention:

Example 1

A. Wax emulsion:

| | Parts by wt. |
|---|---|
| Refined paraffin | 180 |
| Oxidized microcrystalline paraffin (Crown 36) | 20 |
| Emulsifier | 40 |
| Water | 720 |
| | 960 |

B. Metallic salt: Basic aluminum acetate, $Al(C_2H_3O_2)_2OH$ ---------------------- 240

One part by weight of the metallic salt of B dissolved in a small portion of the water of A was mixed with 4 parts by weight of the wax emulsion of A. The emulsifier for the refined paraffin was non-ionic consisting of a mixture in equal parts of polyoxyethylene oleyl ether (Atlas G-3920) and the monostearate of sorbitan (Span 60). Both products are made and sold by Atlas Powder Co. of Wilmington, Delware.

Example 2

Example 1 was repeated using zirconium acetate as the metallic salt.

Example 3

Example 1 was repeated using zinc acetate as the metallic salt.

Example 4

| A. Wax emulsion: | Parts by wt. |
|---|---|
| Refined paraffin | 793 |
| Starch | 35½ |
| Caustic soda | 21 |
| Duponol 80 (sodium octyl sulfate) | 13¾ |
| Water | 2982 |
| B. Metallic salt: Basic aluminum acetate, | |
| $Al(C_2H_3O_2)_2OH$ | 186 |

The basic aluminum acetate of B was dissolved in a part of the water content listed for the wax emulsion A and then added with stirring to the wax emulsion of A.

Example 5

Zinc acetate and zirconium acetate, respectively, were used in place of the basic aluminum acetate of Example 4, in each case in the amount of 186 parts by weight dissolved in a portion of the water content listed for the wax emulsion A of Example 4.

Example 6

| A. Wax emulsion: | Parts by wt. |
|---|---|
| Refined paraffin | 600 |
| Starch | 50 |
| Alrosperse 11P (Fatty amine condensate) (Alrose Chemical Co.) | 12 |
| Neutronyx 600 (100% active aromatic polyglycol ether) (Onyx Oil & Chemical Co.) | 12 |
| Atlas G-3920 (Polyoxyethylene oleyl ether) | 12 |
| Water | 2720 |
| B. Metallic salt: Basic aluminum acetate, | |
| $Al(C_2H_3O_2)_2OH$ | 372 |

Example 7

Zinc acetate and zirconium acetate respectively, were used in place of the basic aluminum acetate of Example 6, in each case in the amount of 372 parts by weight dissolved in a portion of the water content listed for the wax emulsion A of Example 8.

Example 8

| A. Wax emulsion: | Parts by wt. |
|---|---|
| Ouricury wax | 289.5 |
| Refined paraffin | 144.5 |
| Polyethylene glycol monostearate (molecular weight 1000) | 102 |
| Tween 40 (sorbitan monopalmitate) | 25.2 |
| Formaldehyde | 20 |
| Water | 1494 |
| B. Metallic salt: Basic aluminum acetate, | |
| $Al(C_2H_3O_2)_2OH$, 28% solution. | |

One part by weight of a 28% solution of basic aluminum acetate is mixed with four parts by weight of the wax emulsion of A although it should be noted that aluminum acetate solution is miscible with the emulsion of A in all proportions. The resulting composition provides a film which dries with a gloss which is advantageous under certain conditions of use.

Example 9

Zinc acetate and zirconium acetate, respectively, were used in place of the basic aluminum acetate of Example 8, in each case in the amount of four parts by weight of the wax emulsion to one part by weight of a 28% solution of the metal salt.

The examples given thus far involve the use of liquid compositions containing an emulsified water insoluble wax. In the practice of the present invention, water soluble waxy materials such as Carbowax may be used as indicated in the following examples:

Example 10

| | Grams |
|---|---|
| Carbowax 20M (15 to 20,000 molecular weight) | 16 |
| Basic aluminum acetate (powdered) | 16 |
| Water | 40 |

Example 11

Example 12 was repeated using zirconium acetate in place of aluminum acetate.

Example 12

Example 12 was repeated using zinc acetate.

Example 13

To the various compositions set forth in the preceding examples, an amount of aluminum powder was added in the amount of about 1½% to 5% by weight calculated on the basis of the solids. In each case there was an evolution of hydrogen and the mixture was stirred until hydrogen was no longer evolved. The resulting composition provided a film of the same general type referred to but having increased anti-stick characteristics.

In the above examples it should be noted that carnauba wax, sugar cane wax, or equivalent synthetic waxes may be used in conjunction with the refined paraffin or in place thereof. Likewise other water soluble waxy materials may be used in place of or in addition to Carbowax.

In describing the present invention, mention has been made of certain particular fields of use where the anti-stick characteristics of the film formed by the composition were clearly advantageous. In addition to use on asphalt shingles, the composition is useful in the coating of cable coated with bituminous materials, but it will be understood that other fields of application of the composition are present wherever bituminous coated surfaces or uncured rubber surfaces present a problem of sticking.

Having thus described our invention, we claim:

1. An article having an antistick bituminous coated surface consisting of a bituminous surface in combination with a coating consisting essentially of the product obtained by heating to dryness an aqueous solution of a salt of a metal selected from the group consisting of the chlorides, bromides, formates and acetates of aluminum, zinc, and zirconium in combination with a binder comprising a waxy material, the ratio of waxy material to salt being from about 1 to 1 to about 4 to 1 by weight.

2. The article of claim 1 further characterized by the fact that the binder consists of an emulsified water soluble wax.

3. The article of claim 1 further characterized by the fact that the binder consists of a water soluble waxy material.

4. The article of claim 1 further characterized by the fact that said binder contains Carbowax.

5. The article of claim 1 further characterized by the fact that said binder contains paraffin wax.

6. The article of claim 1 further characterized by the fact that said binder contains a mixture of paraffin wax and a hard wax.

7. The article of claim 1 further characterized by the fact that said wax emulsion contains a non-ionic emulsifier.

8. The article of claim 1 in which the metallic acetate is aluminum acetate.

9. The article of claim 1 in which the metallic acetate is zinc acetate.

10. The article of claim 1 in which the metallic acetate is zirconium acetate.

11. The bituminous coated article of claim 1 further characterized by the fact that said aqueous solution of metal salt contains aluminum powder.

References Cited in the file of this patent

UNITED STATES PATENTS

| 2,456,595 | Rood | Dec. 14, 1948 |
| 2,635,055 | Figdor | Apr. 14, 1953 |